US007899085B2

(12) United States Patent
Simmons (10) Patent No.: US 7,899,085 B2
(45) Date of Patent: Mar. 1, 2011

(54) RANGING BETWEEN RADIOS USING PSEUDO TIME OF ARRIVAL SEQUENCE

(75) Inventor: Charles A. Simmons, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 107 days.

(21) Appl. No.: 12/420,882

(22) Filed: Apr. 9, 2009

(65) Prior Publication Data

US 2010/0260207 A1 Oct. 14, 2010

(51) Int. Cl.
*H04J 3/06* (2006.01)
*H04W 24/00* (2009.01)

(52) U.S. Cl. .................................... 370/515; 455/456.1
(58) Field of Classification Search ........................ None
See application file for complete search history.

(56) References Cited

U.S. PATENT DOCUMENTS

| 6,453,168 | B1 | 9/2002 | McCrady et al. | |
| 6,801,782 | B2 | 10/2004 | McCrady et al. | |
| 7,340,259 | B2 * | 3/2008 | Maloney et al. | ........... 455/456.1 |
| 2002/0118723 | A1 * | 8/2002 | McCrady et al. | ............ 375/130 |
| 2008/0161015 | A1 * | 7/2008 | Maloney et al. | ........... 455/456.1 |
| 2009/0149132 | A1 * | 6/2009 | LeFever et al. | ........... 455/67.11 |

FOREIGN PATENT DOCUMENTS

WO 9848578 A2 10/1998

OTHER PUBLICATIONS

Harles, et al., "A novel ranging methods using DVB-S transport stream packets", Seventh International Workshop on digital Signal Processing Techniques for Space Communications, Sesimbra, Portugal (Oct. 2, 2001), pp. 1-7.
Partial European Search Report, EP10159347, (5 pages).

* cited by examiner

*Primary Examiner*—Nittaya Juntima
(74) *Attorney, Agent, or Firm*—Edell, Shapiro & Finnan, LLC (57) ABSTRACT

Systems and methods for refining the determination of the time of arrival (TOA) of given data. A portion of packet data is designated to be used as a pseudo TOA sequence. The packet information is modulated using, e.g., BPSK, and thereafter spread with a chipping stream known at both source and destination radios. The resulting stream includes a TOA reference pattern. On the receive side (destination radio), receive samples are despread and demodulated. The despread data is then XOR'ed with the chipping stream to re-create the TOA reference pattern. The re-created TOA reference pattern and original receive samples (previously stored) are passed through a correlator to obtain a correlation profile, which is then used for curve fitting/interpolation to accurately determine the TOA of the given received sample. Embodiments may be used in conjunction with a radio ranging system.

23 Claims, 5 Drawing Sheets

RANGING BETWEEN RADIOS USING PSEUDO TIME OF ARRIVAL SEQUENCE

FIELD OF THE INVENTION

Embodiments of the present invention are related to ranging, and more particularly to determining a relative or precise position of a mobile device by determining a time of arrival (TOA) of broadcast signals.

BACKGROUND OF THE INVENTION

The capability to rapidly and accurately determine the physical location of a mobile communication device can be of great benefit in a variety of applications. For example, in a military or policing context, it is desirable to keep track of the position of personnel to increase overall safety of the personnel involved and to provide improved situational awareness for commanders. It is also desirable to track the location of selected items such as lap top computers, automobiles, shipping containers, among other things. While Global Positioning System (GPS) technology for obtaining accurate position information has proliferated in recent years, there are instances where the necessary line of sight to one or more satellites for GPS operation is obscured or entirely unavailable. For example, in a military context, personnel may be operating both outdoors and indoors. Those indoors may simply not have the benefit of receiving GPS signals, thus making it difficult to know their precise location. Likewise, an automobile parked in a garage or a shipping container in a warehouse would not have the benefit of GPS signals. Accordingly, position tracking of such personnel or items is not possible when relying exclusively on GPS.

To address the limitations of GPS technology, some radio transceivers rely on a location determination approach that is based on Time of Arrival (TOA) of packets or messages exchanged between radios. More specifically, to determine the position of a mobile communication device, the device receives multiple timing signals from known locations. Knowing how long the messages take to be received, it is possible to calculate a range between the device and the location of the transmitters providing the timing signals. The mobile communication device can then compute its position using triangulation, assuming signals from multiple transmitters can be received.

In one well-known implementation of such a ranging system, request to send (RTS) and clear to send (CTS) packets or messages that are exchanged between radios in accordance with selected protocols are leveraged to acquire timing information. More specifically, a source radio sends an RTS packet to a destination radio, and the destination radio replies with a CTS packet if the destination radio can accept the message to be supplied by the source radio. Upon receipt of the CTS packet, the source radio sends a message (MSG) packet. The destination radio then sends back an acknowledgement (ACK) if it successfully received the message. Radios operating in accordance with such a protocol can use the acquisition part of the RTS and CTS packets to determine when synchronization occurs. This synchronization information can then be used to determine the range between the two transceivers by timing how long it takes the CTS to come back to the source radio, i.e., the round trip time can be calculated.

More sophisticated radio transceivers may also use special ranging transmissions to more accurately determine the range between the radios. Such radios are described in, e.g., U.S. Pat. No. 6,453,168 to McCrady et al., which is incorporated herein by reference. Such a system employs dedicated TOA packets that contain a specially designed TOA reference bit pattern that operates with more robust synchronization detectors. The TOA bit patterns are usually very slow, long, and highly ideal correlator patterns compared to that for a high data rate radio system. These TOA reference patterns are used by the receiver to determine the synchronization time more accurately by effectively interpolating when the synchronization peak occurs finer than the clock's resolution. The TOA packets are used to range between several transceivers. This allows the transceivers, as in the more conventional approaches, to determine their relative positions. This information may then be used to form a situational view of the locations of the receivers.

As described in U.S. Pat. No. 6,453,168, conventional RTS and CTS messages can be modified to support the ranging messaging scheme. In effect, conventional hardware for handling RTS and CTS exchanges is leveraged to also capture "RTS" and "CTS" messages that contain the more sophisticated TOA synchronization data or bit patterns.

The aforementioned techniques either provide a low accuracy answer (when relying exclusively on the acquisition portion of conventional RTS and CTS messages) or cause a network throughput "hit" in that additional, modified, "RTS" and "CTS" messages are being exchanged over the network, thereby consuming bandwidth that might otherwise be used for voice/data communications. More specifically, the ranging measurement provided by the conventional synchronization technique is coarse—it provides a relatively inaccurate measurement that may not provide sufficiently useful situational awareness. In the more sophisticated approach, the special TOA packets cause a reduced data throughput. When the TOA packets are being transmitted, no network data can be transmitted. Situational awareness needs high accuracy (<3 meters) and this means that a radio may need to send several TOA packets to several radios in order to triangulate its position. Additionally, all radios need to do this, resulting in even less overall bandwidth that is available for voice/data communications.

SUMMARY OF THE INVENTION

Embodiments of the present invention provide a relatively more refined calculation of the time of arrival (TOA) of selected data that is passed between radios. With such improved TOA information, improved radio ranging and thus radio location can be achieved. In accordance with embodiments of the present invention, a portion of packet data is designated to be used as a pseudo TOA sequence. The packet information is modulated using, e.g., BPSK, and thereafter spread with a chipping stream known at both source and destination radios. The resulting stream includes a TOA reference pattern (i.e., the portion corresponding to the pseudo TOA sequence). On the receive side (destination radio), receive samples are despread and demodulated. The despread data is the receiver's estimate of the differential binary phase shift keying (DBPSK) data. This DBPSK data is then XOR'ed with the chipping stream to re-create the TOA reference pattern. The re-created TOA reference pattern and original receive samples (previously stored) are then passed through a correlator to obtain a correlation profile, which is then used for curve fitting/interpolation to accurately determine the TOA of the given received sample.

More specifically, a method according to an embodiment of the present invention includes converting a received radio signal to a series of received samples, despreading the received samples by applying a chipping stream to the received samples to obtain DBPSK data, performing an XOR operation between the DBPSK data, and preferably a selected pseudo TOA sequence designated from a portion (or all) of packet data, and the chipping stream, resulting in a TOA reference pattern, and correlating the received samples with the TOA reference pattern to obtain a correlation profile that is used to determine the TOA of a given received sample.

The method preferably also includes detecting a communication synchronization sequence associated with a given packet and generating a synchronization detect signal, which is used by a despreader in the despreading step.

As will be appreciated by those skilled in the art, the received samples are stored, at least temporarily, so that they can then be supplied in the correlating step.

Using the timing information gleaned from the correlation step, it is then possible to determine a range of a first radio to a second radio. Moreover, it is possible to determine the range and thus position, through, e.g., triangulation, of a plurality of radios that may be in the field.

These and other features of the several embodiments of the invention along with their attendant advantages will be more fully appreciated upon a reading of the following detailed description in conjunction with the associated drawings.

DETAILED DESCRIPTION

Figure 1:
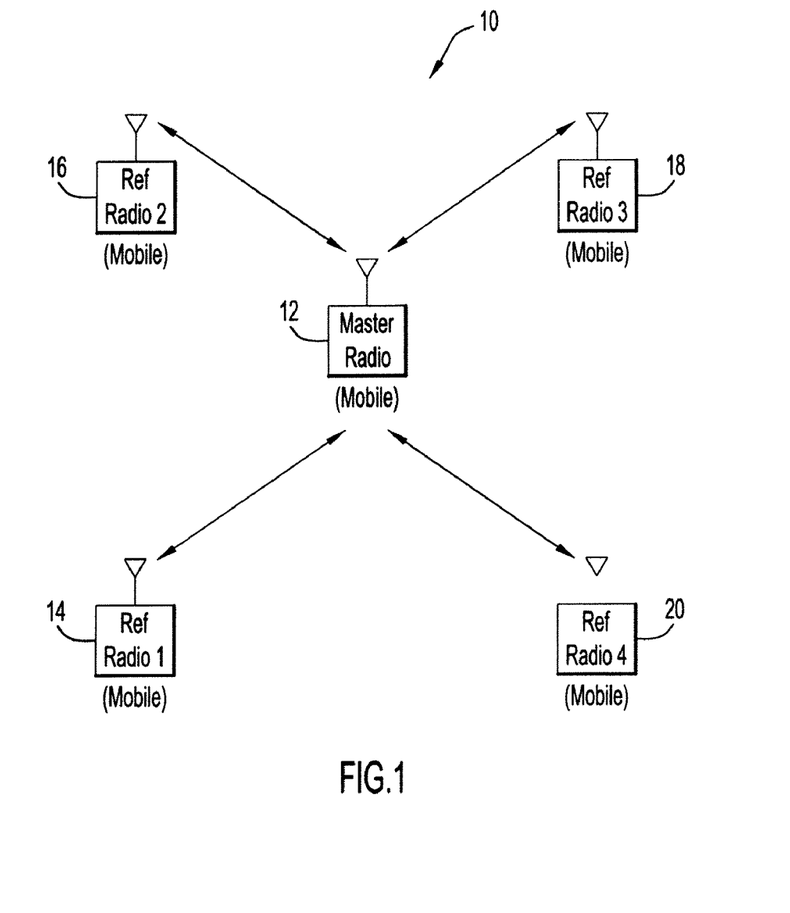
FIG. 1 depicts multiple radios in an operational scenario in accordance with an embodiment of the present invention.

Referring to FIG. 1, a position location system 10 includes a target or "master" mobile communication device or radio 12 communicating with four reference communication devices 14, 16, 18 and 20. As used herein, a mobile communication device or mobile radio is any portable device capable of transmitting and/or receiving communication signals, including but not limited to: a handheld or body-mounted radio; any type of mobile telephone (e.g., analog cellular, digital cellular or satellite-based); a pager or beeper device; a radio carried on, built into or embedded in a ground-based or airborne vehicle; or any portable electronic device equipped with wireless transmission and reception capabilities.

Each of reference radios 14, 16, 18 and 20 can be any radio located at a known position that is capable of communicating with the master radio 12 in the manner described herein to convey position and range-related information. For example, one or more of the reference radios can be a beacon-like radio fixedly mounted in a known location, such as on a tower or building. One or more of the reference radios can also be a mobile radio capable of determining its position from others sources, such as from reception of global position system (GPS) signals or from being presently located at a surveyed position whose coordinates are known and entered into the radio (the reference radios are not themselves GPS satellites). Finally, as explained in greater detail hereinbelow, one or more of the reference radios relied upon by a particular target radio can be another mobile communication device similar or identical to the master radio, wherein the reference radio determines its own position in accordance with the technique of the present invention (in this case, the "reference" radio functions as both a reference radio for other radios and as its own "master" radio). The fact that each reference radio could potentially be a mobile radio is indicated in FIG. 1 by the designation "(MOBILE)" next to each of reference radios 14, 16, 18 and 20.

Master radio 12 communicates with the four reference radios 14, 16, 18 and 20 to determine its location in three dimensions. Specifically, master radio 12 and each of reference radios 14, 16, 18 and 20 includes an antenna coupled to a transmitter and a receiver (e.g., a transceiver) for transmitting and receiving communications, such as voice and data messages. The time of arrival (TOA) of ranging selected data transmitted between the master and reference radios is used to determine the range to each reference radio, and trilateration may then be used to determine from the range measurements the location of the master radio with respect to the reference radios. Each reference radio must know its own position and convey this information to the master radio to enable the master radio to determine its position from the ranging messages exchanged with the reference radios.

As in the system described in U.S. Pat. No. 6,453,168, the system of the present invention employs a two-way or round-trip ranging scheme. As seen from the bi-directional arrows in FIG. 1, master radio 12 transmits to each of the reference radios 14, 16, 18 and 20 an initial outbound ranging message and receives back from each reference radio a reply ranging message. For example, master radio 12 sequentially exchanges ranging messages with each individual reference radio, first exchanging ranging messages with reference radio 14, then with reference radio 16, etc. It is also possible that master radio 12 sends out one RTS to all four other radios. Then the other four radios send back their own CTS in a time sequence fashion. This can help to cut down on the over the air traffic thereby further improving network throughput.

Unlike the system described in U.S. Pat. No. 6,453,168, however, separate or dedicated ranging messages (e.g., special modified RTS and CTS messages) are not employed between and among the several radios. Rather, TOA overhead associated with such dedicated ranging messages can effectively be eliminated by making use of the normal data (e.g., voice) being transmitted between the radios.

Rather than exchanging dedicated ranging messages, embodiments of the present invention leverage several consecutive data bits to create a long pseudo TOA reference pattern. Assuming a direct sequence spread spectrum transceiver system, the demodulated bit values and the random spreading stream can be used as a TOA acquisition sequence bit stream into a dedicated correlator. In an embodiment of the present invention, this dedicated correlator is known as a TOA correlator, identified in FIG. 3 by reference numeral 344.

Figure 2:
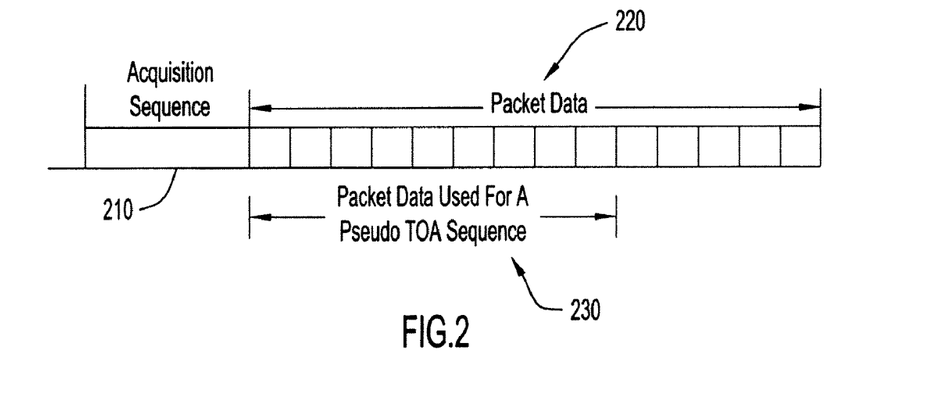
FIG. 2 depicts a data packet, a portion of which is used for a pseudo TOA sequence in accordance with an embodiment of the present invention.

An example packet with an acquisition sequence and data is shown in FIG. 2. As shown, the packet includes an Acquisition sequence 210 and a data portion 220 that comprises the packet data. A subset 230 of this data (the size of which is arbitrarily set by the designer) is used for the pseudo TOA reference sequence. By designating a portion of the packet data in this manner, a "parasitic" TOA scheme using only the packet data 220 is made possible. Significantly, no special or dedicated TOA packets are needed. The actual TOA of a given packet, as will be explained more fully below, can then be calculated using techniques described in U.S. Pat. No. 6,453, 168.

Figure 3:
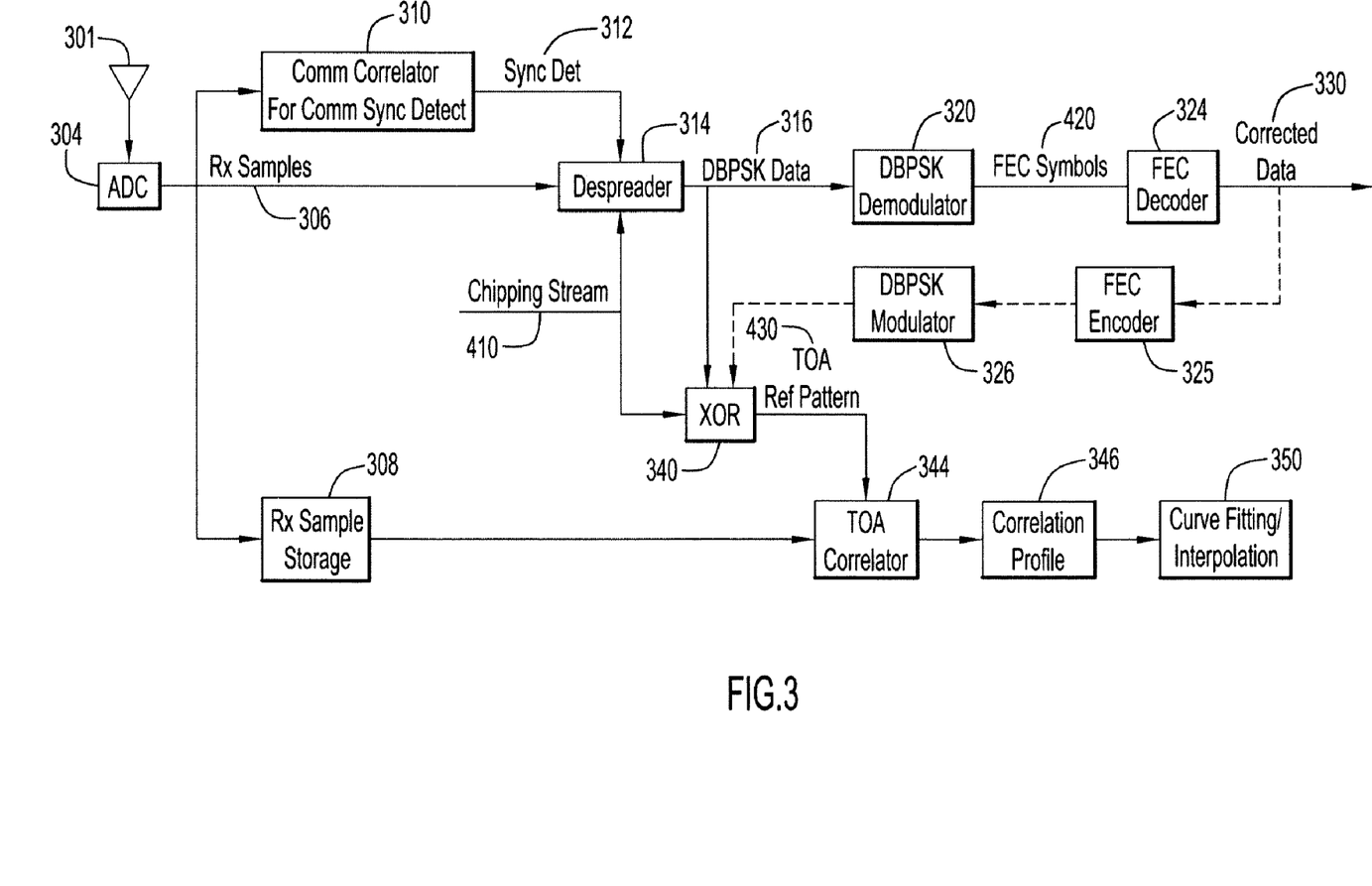
FIG. 3 depicts a block diagram of a portion of receiver that is configured to operate in accordance with an embodiment of the invention.

FIG. 3 depicts a block diagram of a portion of a receiver that is configured to operate in accordance with an embodiment of the present invention, i.e., relies on a TOA reference pattern that presents itself in packet data 220.

Figure 4:
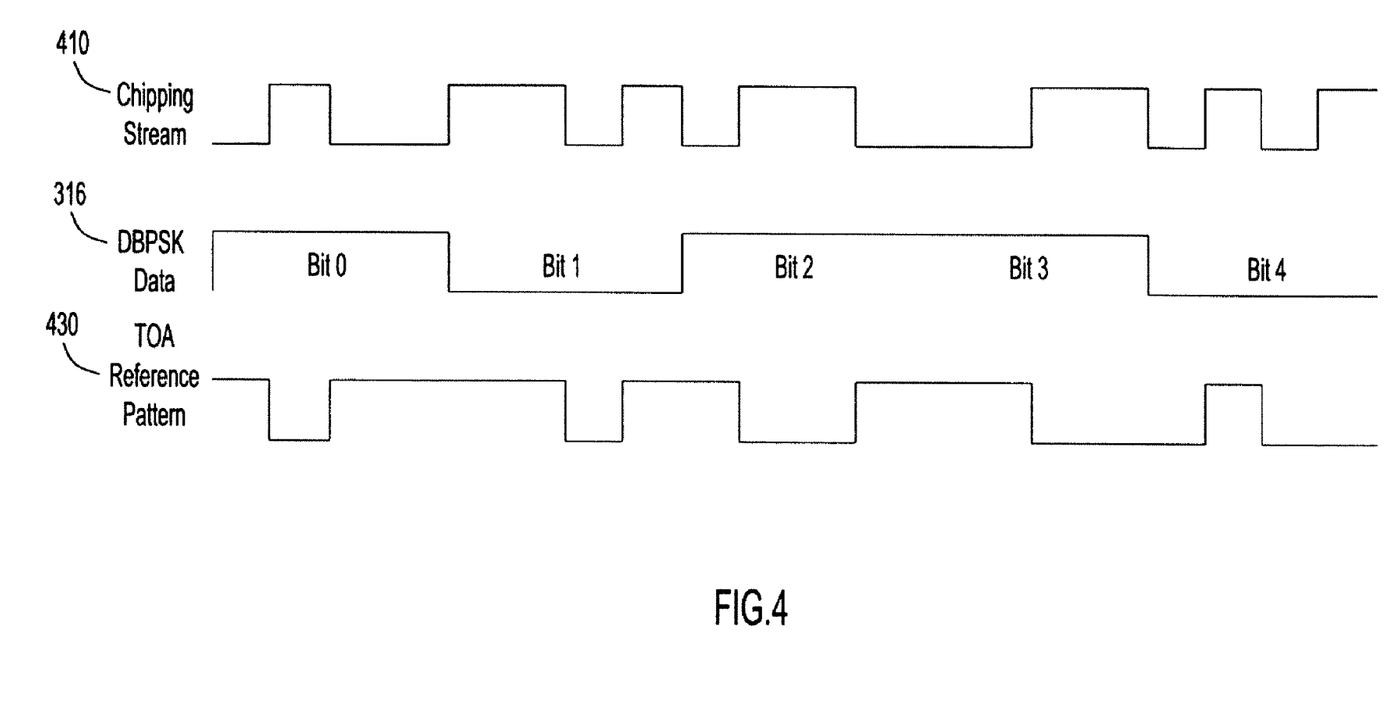
FIG. 4 is a timing diagram that shows the development of a TOA reference pattern from a chipping stream and data in accordance with an embodiment of the present invention.

More specifically, and as shown in FIG. 3, an antenna 301 receives incoming radio frequency (RF) information which is fed (typically after being downconverted to a baseband frequency) to an analog-to-digital converter (ADC) 304, which samples at a rate at least as twice as high as the frequency of a spreading or chipping stream 410 (shown in FIG. 4). Resulting receive (Rx) samples 306 are fed to several functional blocks/modules including a communication correlator for communication synchronization detection ("comm correlator") 310, a despreader 314 and a Rx sample storage block 308. Comm correlator 310 detects the beginning of packets using the acquisition sequence 210 of a packet (see FIG. 2), as is well-known, resulting in a SYNC detect signal 312 that is passed to despreader 314.

Using the SYNC detect signal, the despreader 314 performs an XOR operation between the Rx samples 306 and the chipping stream 410, resulting in despread, e.g. differential binary phase shift keying DBPSK) data 316, which is passed to DBPSK demodulator 320 to obtain the FEC symbols 420 (also shown in FIG. 4). The FEC symbols 420 are then passed through a forward error correction decoder (FEC Decoder) 324 to obtain corrected final data 330. This data could be voice or non-voice data.

The output of the Despeader 314, DBPSK data 316, is fed directly to XOR block 340. The output of XOR module 340 is TOA reference pattern 430 (also shown in FIG. 4). Alternately, the corrected data 330 is then passed back through FEC encoder 325 and DBPSK modulator 326. The output of DBPSK modulator is provided to XOR block 340, which performs an XOR operation between re-created data 316 and the chipping stream 410.

The generated, or re-created, TOA reference pattern output from XOR block 340 is provided to a "TOA correlator" 344, which performs a correlation operation between the TOA reference pattern 430 and corresponding Rx samples 306 that were temporarily stored in Rx sample storage block 308. The output of the TOA correlator 344 is a correlation profile 346 that is fed to a curve fitting/interpolation module 350, which may be configured as described in U.S. Pat. No. 6,453,168.

In accordance with embodiments of the present invention, the correlation profile 346 is used to interpolate when a correlation peak occurs between samples. The interpolation provides a finer resolution than a clock for the ADC 304 used to sample the received signal and, as such, it is possible to determine the time of arrival finer than the clock period. This is a discrete time sample system as opposed to a continuous time system. The discrete samples from the TOA correlator effectively sample a continuous profile. Based on the sampling phase, the correlation profile 346 will look different. The shape of the profile indicates where between samples the peak occurred. If the profile has its highest value on one sample and the two samples on either side have the same value, the correlation peak occurred on the sample. If the two highest values are on adjacent samples and have the same value, the peak occurred half way between the two samples.

If just the communication correlator were used, the accuracy would be limited to the RF bandwidth of the received signal. For example, with a 1 MHz ADC sample rate and a corresponding RF bandwith, a precision of 1 uS can be achieved. This 1 uS equates to one kilometer in range. The TOA correlator 344 with its longer TOA reference pattern 430, and interpolation can get much higher resolution.

Referring now to FIG. 4, and for purpose of description only, DBPSK (differential binary phase shift keying) data modulation with a chipping stream is assumed. The DBPSK data 316 is modulated into a spreading stream by multiplying it with the chipping stream 410 (a random serial sequence of bits) (here shown as four chips per bit). Stated alternatively, a modulated spreading stream is formed by multiplying the chipping stream with the BPSK data. This process essentially exclusive ORs the chips with the data. The resulting stream becomes the relatively long TOA reference pattern 430, which is at least part of the digital data that is transmitted from a given radio.

In an actual implementation, the length of the TOA reference pattern 430 may be very long (e.g., 1023 bits) to provide a more accurate time calculation. The longer the length, the more noise can be filtered out by the correlator. It is noted that the data bits of the DBPSK data 316 are those that are the input to the spreading operation and may not actually be the payload data of a packet, but instead may correspond to the differential encoding of the output of a forward error correction (FEC) encoder.

In accordance with the present invention, on the receive side, a demodulator needs to correlate the TOA reference pattern 430 with the chipping stream 410 (which is a priori known at the receive side). Because there is data modulation in the received spreading stream (TOA reference pattern 430), the correlation with the receiver's chipping stream may be poor. However, a TOA reference pattern can be developed by compensating for this DBPSK modulation, as shown in FIG. 3. This is the receiver's version of the TOA reference pattern. This version is developed, as explained above, by using the receiver's version of the DBPSK data 316 to modulate the chipping stream 410. Those chips associated with a certain data bit are then modulated. As in all receivers, the demodulated data may have bit errors. This may present issues, but with forward error correction could be overcome.

Ultimately, the data modulation needs to be taken into account while doing the correlation. This means that either the modulation is stripped from the received spreading stream or the modulation is to be applied to the receiver's chipping stream.

For the sake of discussion, assume the receiver's chipping stream 410 is modulated with the DBPSK data 316. Once the receiver's modulated stream is developed, the received spreading stream can be correlated against it. The correlator's output samples around the peak can then be used to interpolate a more precise time of synchronization. Preferably, several samples before the spreading stream and after the spreading stream are used for calculating the additional correlator output samples.

The TOA correlation can be achieved with various techniques. A first technique uses a traditional correlator, such as correlator 344. Its reference pattern would be the receiver's TOA reference pattern. The correlator output samples around the peak are saved for the interpolation.

Figure 5:
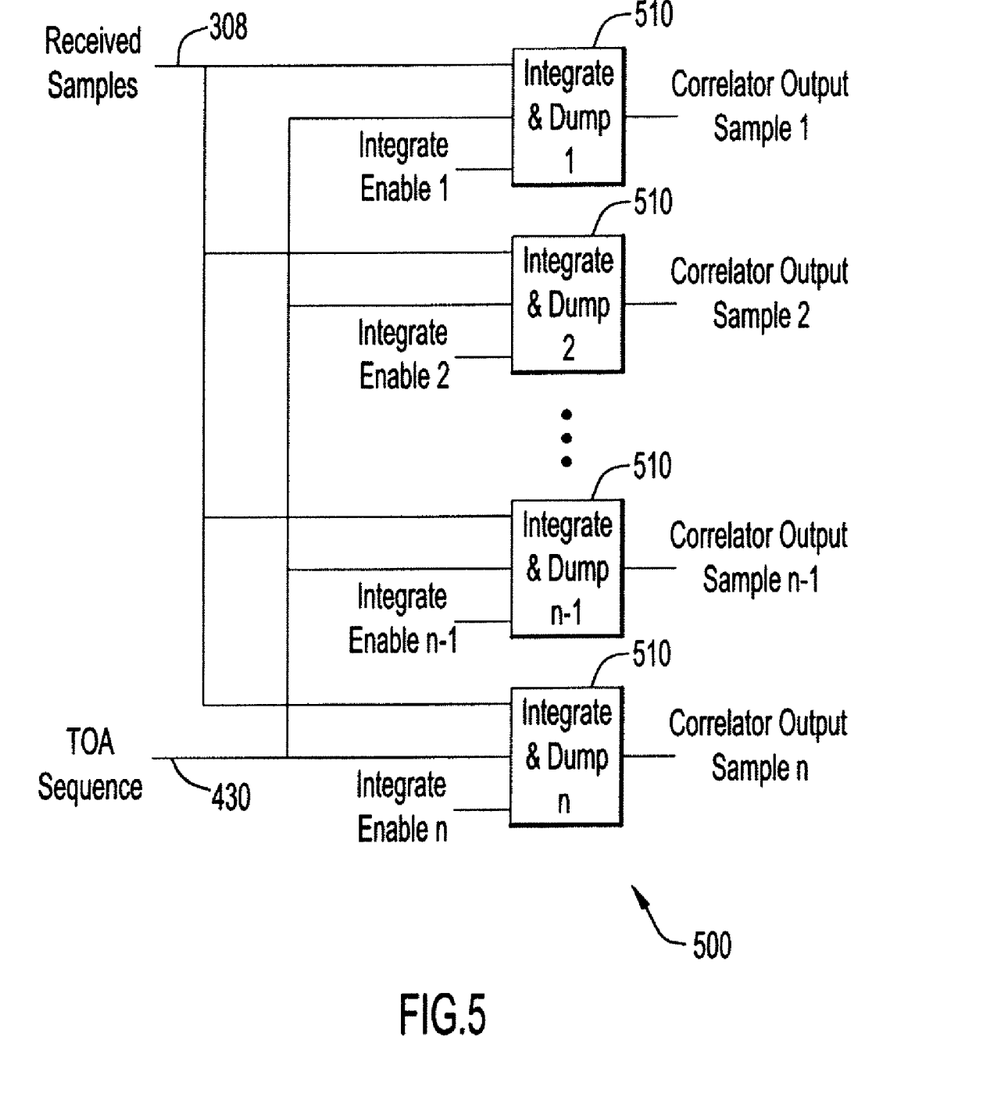
FIG. 5 shows an array of "integrate and dump" modules that provide TOA correlator output samples in accordance with an embodiment of the present invention.

A second technique takes advantage of an "integrate and dump" structure as shown in FIG. 5. This structure 500, comprised of a series of integrate and dump modules 510, can significantly save computational resources and power consumption compared to a correlator. Structure 500 takes advantage of the receiver knowing where synchronization for the packet data occurs. An integrate and dump function provides one correlation sample at a specific time. Such structures are used in some direct sequence spread spectrum (DSSS) receivers to de-spread, or correlate to a data bit. They effectively determine the correlation peak for the data bit. In this case, they would correlate to the TOA reference pattern 430.

Figure 6:
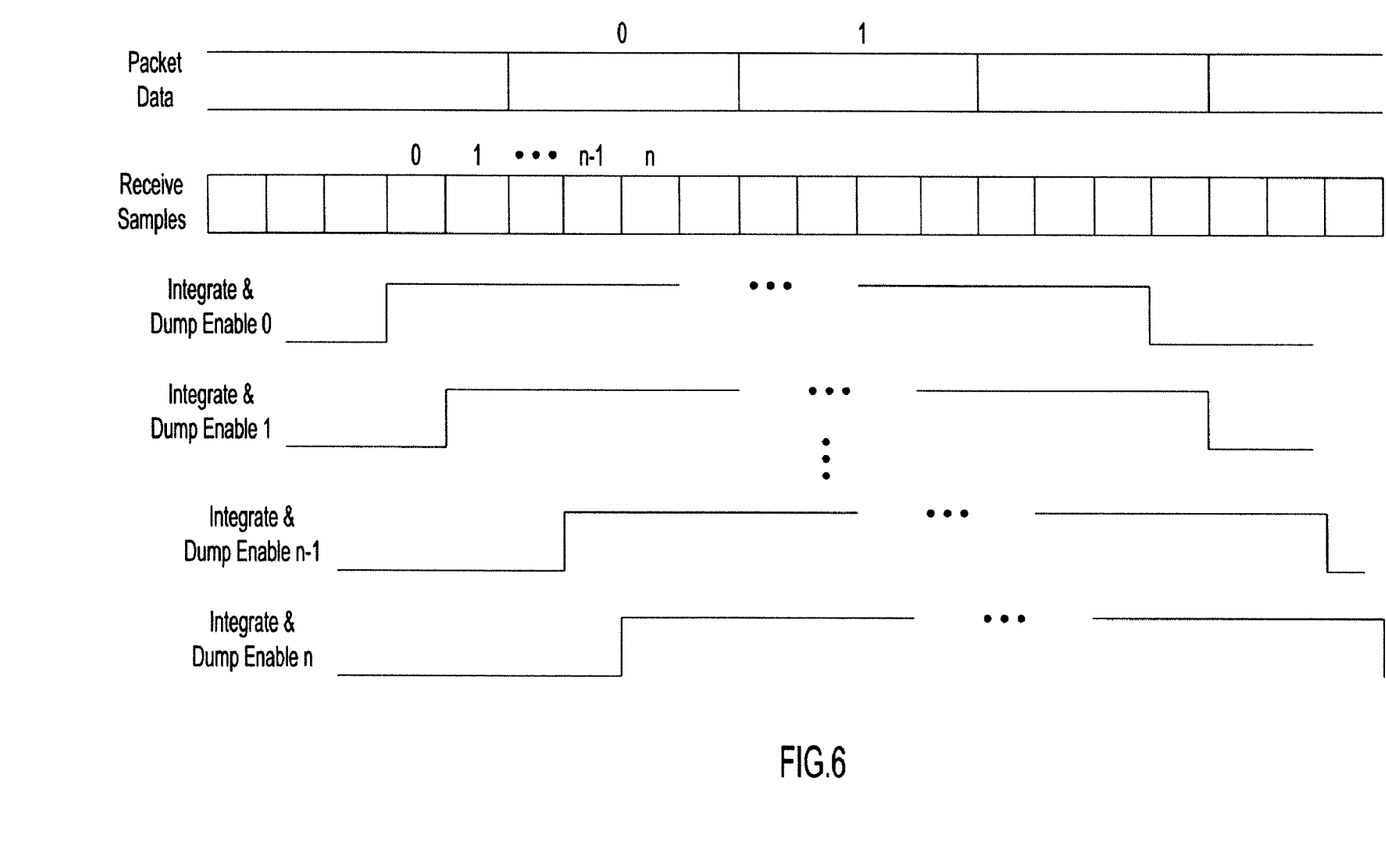
FIG. 6 is a timing diagram depicting control signals for the "integrate and dump" modules of FIG. 5 in accordance with the present invention.

An array of integrate and dumps are preferable, as shown in FIG. 5, because several correlator output samples around the peak are preferably relied upon. There is preferably an integrate and dump module for each correlator output sample needed. As shown in FIG. 6, in order to get the correlator output profile around the peak, the first integrate and dump starts integrating several chip periods before the start of the first data bits used for TOA. Each successive integrate and dump is started one sample after the previous one. The TOA reference pattern is the chipping sequence for the integrate and dump modules.

The TOA reference pattern 430 affects the interpolation results. That is, correlator patterns can cause some unfavorable effects on the output of the correlator. If the pattern has poor cross correlation, then the output may be noisy. That noise can affect the profile with higher noise peaks. Essentially, the noise peaks occur as the input is slid across the reference. There are ideal reference patterns that optimize correlator output results such as "Gold codes." These should be used as the chipping sequence for the data bits. However, some systems may have to trade off this performance gain against other system parameters. For example secure communication systems cannot use ideal correlator patterns because they can be easily detected and used to extract the protected information or spoof the intended user.

The TOA performance can also be improved by taking advantage of forward error correction. There can be errors in the data demodulation of the FEC symbols that cause issues in the TOA correlation process. These data errors can be corrected with forward error correction. If the output of the FEC decoder were re-encoded through an FEC encoder, these corrected FEC data bits could then be used to compensate for the transmitter's data modulation. This would improve TOA correlation results between radios that are relatively far apart and thus possibly have errors in the demodulated data.

TOA relies on developing a round trip time that is adjusted based on the interpolation results. The round trip time is measured in the source radio. The source radio will send a packet to a destination radio. The destination will return a packet to the source. The source radio times when the source packet was transmitted until the destination packet is received. In the prior art "active" TOA, dedicated TOA RTS/CTS packets are used. In this passive TOA in accordance with embodiments of the present invention, the normal RTS, CTS, Message and ACK packets can be used. These normal RTS/CTS and ACK have data that serve as a way to setup message transmission aspects such as data rate and RF frequency. This data can also serve as the basis for the passive TOA reference sequence. As well, Message data could be used. This requires a return message from the destination and may contain the curve fitting results for the destination. Additionally, there is usually background traffic being passed between radios so that they know with whom they can communicate. This network infrastructure traffic can be also used for passive TOA.

It may be important to know when passive TOA is operating. In one embodiment, radios will always run the passive TOA circuitry or software routines. The destination's TOA information and turn around delay will only be used if the source has indicated TOA operation. Part of the RTS or the message header could indicate this. Alternatively, passive TOA could operate on a predetermined scheduled basis.

One of the key details of round trip time is that the destination precisely transmits its packet after a pre-defined time based on when it received the source packet This is known as the turn around time, TX_Delay.

The round trip time is about twice as long as the one way time. Of course, the destination radio's transmit turn around time, Tx_Delay, has to be subtracted in the equation. There are also radio processing or latency delays, Latency_Delays, that have to be subtracted as well. This leaves a coarse value for the round trip time. This coarse value is then adjusted by the curve fit results for both radios, Curve_Fit_Result_Dest and Curve_Fit_Result_Srce, as provided in the equation below.

$$TOA = (Round\_Trip\_Time - Tx\_Delay - Latency\_Delays + Curve\_Fit\_Result\_Dest + Curve\_Fit\_Result\_Srce)/2$$

Those skilled in the art will appreciate that the foregoing disclosure should not be construed as limiting the invention, which is defined only by the claims appended hereto. That is, the principles of the present invention may be applied in any number of circumstances. For example, the TOA reference methodology described herein may be extended to radio systems not based on handshaking protocols or DSSS, as described below.

Time Division Multiple Access (TDMA)

Embodiment of the present invention may be applied to TDMA systems by using the dedicated transmission and reception slots and the message payload data. The distance between radios can be calculated by taking into account the TDMA slot durations and the slot assigned to a radio in the TOA calculation.

Non-Spread Data Embodiment

Embodiments of the present invention may also be extended to non-spread systems by using the consecutive data bits in a transmission as the TOA reference pattern. The demodulated data or the error corrected data is the TOA reference pattern.

Communication Acquisition Sequence

In this context, an embodiment of the present invention may use the acquisition sequence as a short TOA sequence. This would provide the acquisition correlator output samples to the curve fitting algorithm. However, the sequence may have to be extended to get the accuracy needed by the system (or application).

Including Normal TOA Sequences in Data Communication Packets

TOA symbols can be included in the normal communication packets. This allows more ideal correlator reference patterns for a more precise range. However, it grows the length of the normal communication packets. But no special TOA packets are needed.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method, comprising:
converting a received a radio signal to a series of received samples;
despreading the received samples by applying a chipping stream to the received samples to obtain despread data;
demodulating the despread data to obtain demodulated data;

remodulating the demodulated data, to obtain remodulated data performing an XOR operation between the remodulated data and the chipping stream resulting in a time of arrival (TOA) reference pattern; and correlating the received samples with the TOA reference pattern to obtain a correlation profile that is used to determine the TOA of a given received sample.

2. The method of claim 1, further comprising detecting a communication synchronization sequence associated with a given packet and generating a synchronization detect signal.

3. The method of claim 2, further comprising performing the despreading based, at least in part, on the synchronization detect signal.

4. The method of claim 1, further comprising storing, at least temporarily, the received samples.

5. The method of claim 1, further comprising performing forward error correction on the demodulated data.

6. The method of claim 1, further comprising determining a range of a first radio to a second radio based on the TOA of a given received sample.

7. The method of claim 1, wherein the converting comprises converting the received samples with an analog to digital converter.

8. The method of claim 1, further comprising designating a portion of packet data as a pseudo TOA sequence.

9. The method of claim 8, further comprising correlating the pseudo TOA sequence and the TOA reference pattern.

10. The method of claim 1, further comprising fielding a plurality of radios, each being configured to operate in accordance with claim 1.

11. The method of claim 10, further comprising determining a location of a given radio based on the range thereof to other of the plurality of radios.

12. A method, comprising:

converting a received a radio signal to a series of received samples;

despreading the received samples, to obtain despread data, by applying a chipping stream to the received samples to obtain despread data;

demodulating the despread data to obtain demodulated data;

remodulating the demodulated data data to obtain remodulated data;

performing an XOR operation between the remodulated data and the chipping stream resulting in a time of arrival (TOA) reference pattern; and passing the TOA reference pattern and received samples to a series of integrate and dump modules that are clocked successively.

13. The method of claim 12, further comprising starting an integration process for each successive integration and dump module at a time corresponding to respective received samples.

14. The method of claim 12, further comprising detecting a communication synchronization sequence associated with a given packet and generating a synchronization detect signal.

15. The method of claim 14, further comprising performing the despreading based, at least in part, on the synchronization detect signal.

16. The method of claim 12, further comprising storing, at least temporarily, the received samples.

17. The method of claim 12, further comprising performing forward error correction on the demodulated data.

18. The method of claim 12, further comprising determining a range of a first radio to a second radio based on the TOA of a given received sample.

19. The method of claim 12, wherein the converting comprises converting the received samples with an analog to digital converter.

20. The method of claim 12, further comprising designating a portion of packet data as a pseudo TOA sequence.

21. The method of claim 20, further comprising supplying the pseudo TOA sequence and the TOA reference pattern to the series of integrate and dump modules.

22. The method of claim 12, further comprising fielding a plurality of radios, each being configured to operate in accordance with claim 12.

23. A system, comprising:

an analog to digital converter configured to supply samples of a signal;

a communication correlator configured to receive the samples and detect a packet communication synchronization sequence therein;

a despreader module configured to despread the samples based on a chipping stream and the packet communication synchronization sequence;

a demodulator configured to demodulate an output of the despreader module;

an XOR module configured to perform an XOR operation between DBSPK data output from the despreader and the chipping stream, resulting in a time of arrival (TOA) reference pattern; and a TOA correlator configured to correlate the samples with the TOA reference pattern to obtain a correlation profile that is used to determine the TOA of a given received sample.

* * * * *